United States Patent [19]

Morishita

[11] 4,084,670

[45] Apr. 18, 1978

[54] INCHING CONTROL SYSTEM FOR INDUSTRIAL VEHICLES

[75] Inventor: Seishi Morishita, Osaka, Japan

[73] Assignee: Toyo Umpanki Co., Ltd., Osaka, Japan

[21] Appl. No.: 750,341

[22] Filed: Dec. 13, 1976

[30] Foreign Application Priority Data

Dec. 15, 1975 Japan .................. 50-149886

[51] Int. Cl.² .............. B60K 41/24; F16D 67/02
[52] U.S. Cl. .................................. 192/13 R
[58] Field of Search ............... 192/13 A, 13 R, 4 C

[56] References Cited

U.S. PATENT DOCUMENTS

| | | | |
|---|---|---|---|
| 2,186,332 | 1/1940 | Freeman | 192/13 A |
| 2,917,143 | 12/1959 | Jenney | 192/13 R |
| 3,181,667 | 5/1965 | Lohbauer et al. | 192/13 R |
| 3,240,371 | 3/1966 | Conrad | 192/13 R |
| 3,292,752 | 12/1966 | Schuster et al. | 192/13 R |
| 3,313,383 | 4/1967 | LaTendresse | 192/13 R |
| 3,631,948 | 1/1972 | Ishikawa | 192/13 R |
| 3,705,643 | 12/1972 | Iwaoka et al. | 192/13 A |
| 3,841,450 | 10/1974 | Drone et al. | 192/13 R |

*Primary Examiner*—Lloyd L. King
*Attorney, Agent, or Firm*—Sughrue, Rothwell, Mion, Zinn and Macpeak

[57] ABSTRACT

An inching control system for an industrial vehicle includes an air booster whose hydraulic output pressure is branched to a brake system via a limiting valve and to a clutch system via a threshold pressure responsive clutch control valve. The latter is set to engage/disengage the clutch at a pressure level higher than that at which the brakes are actuated, whereby single pedal inching control is implemented while at the same time initial backsliding is prevented when the vehicle is on an incline.

1 Claim, 4 Drawing Figures

4,084,670

INCHING CONTROL SYSTEM FOR INDUSTRIAL VEHICLES

BACKGROUND OF THE INVENTION

This invention relates to an inching control system for an industrial vehicle.

The conventional inching control system operates to disconnect the vehicle clutch when the brake pedal is depressed, thereby enabling an inching or step-wise advance under the control of a single pedal whereby, for example, a fork lift truck can gradually and safely approach a shipping pallet or a loading/unloading platform.

If the inching system disconnects the clutch immediately upon the depression of the brake pedal, however, then the stopped vehicle does not start up again the instant the brake pedal is released. That is, there is a time delay between the release of the brake pedal and the reengagement of the clutch. Accordingly, if the vehicle is on a ramp of incline, it coasts backward to some extent before its forward motion is resumed. In order to prevent such dangerous backsliding, two brake pedals are often provided. One controls the inching system; the other is independent of the inching system, and the two brake pedals are separately depressed and controlled by the operator. Such a dual brake system arrangement is different to operate, however, and its construction is both costly and intricate.

Examples of various types of prior art systems are disclosed in U.S. Pats. Nos. 2,872,000; 2,917,143; 3,181,667; 3,292,752; 3,313,383, 3,631,948 and 3,705,643.

SUMMARY OF THE INVENTION

Briefly, and according to the present invention, an inching system for an industrial vehicle comprises a brake system which begins to take effect when the hydraulic fluid exceeds a first, relatively low predetermined pressure; a clutch system which is disengaged when the hydraulic fluid exceeds a second predetermined pressure, higher than the first; means for supplying hydraulic operating fluid pressure from a Hydromaster or air driven booster directly to the brake system and the clutch system through a branch valve; and a single brake pedal for applying a hydraulic pressure proportional to the amount of pedal depression through a master cylinder to the Hydromaster. When the effective amount of the brake pedal depression is relatively low, the clutch remains engaged and the brakes are weakly applied; when the brake pedal is further depressed to a relatively high degree, the clutch is disengaged while the braking force is maintained and increased.

Thus, depending on the magnitude of the brake pedal depression, a state of clutch engagement and simultaneous brake application wherein engine braking is also applied, and a state of clutch disengagement and continued brake application, can be easily controlled. Conversely, the clutch becomes reengaged before the operator's foot leaves the brake pedal by gradually releasing or letting up on the latter, whereby a smooth inching operation can be carried out. Furthermore, to decelerate the vehicle both engine braking and foot braking can be applied. When the vehicle is on an incline, it can be moved forward without any initial backward motion because the clutch becomes engaged before the brakes are fully released, merely by gradually releasing the brake pedal.

DETAILED DESCRIPTION OF THE PREFERRED EMBODIMENT

Figure 1:
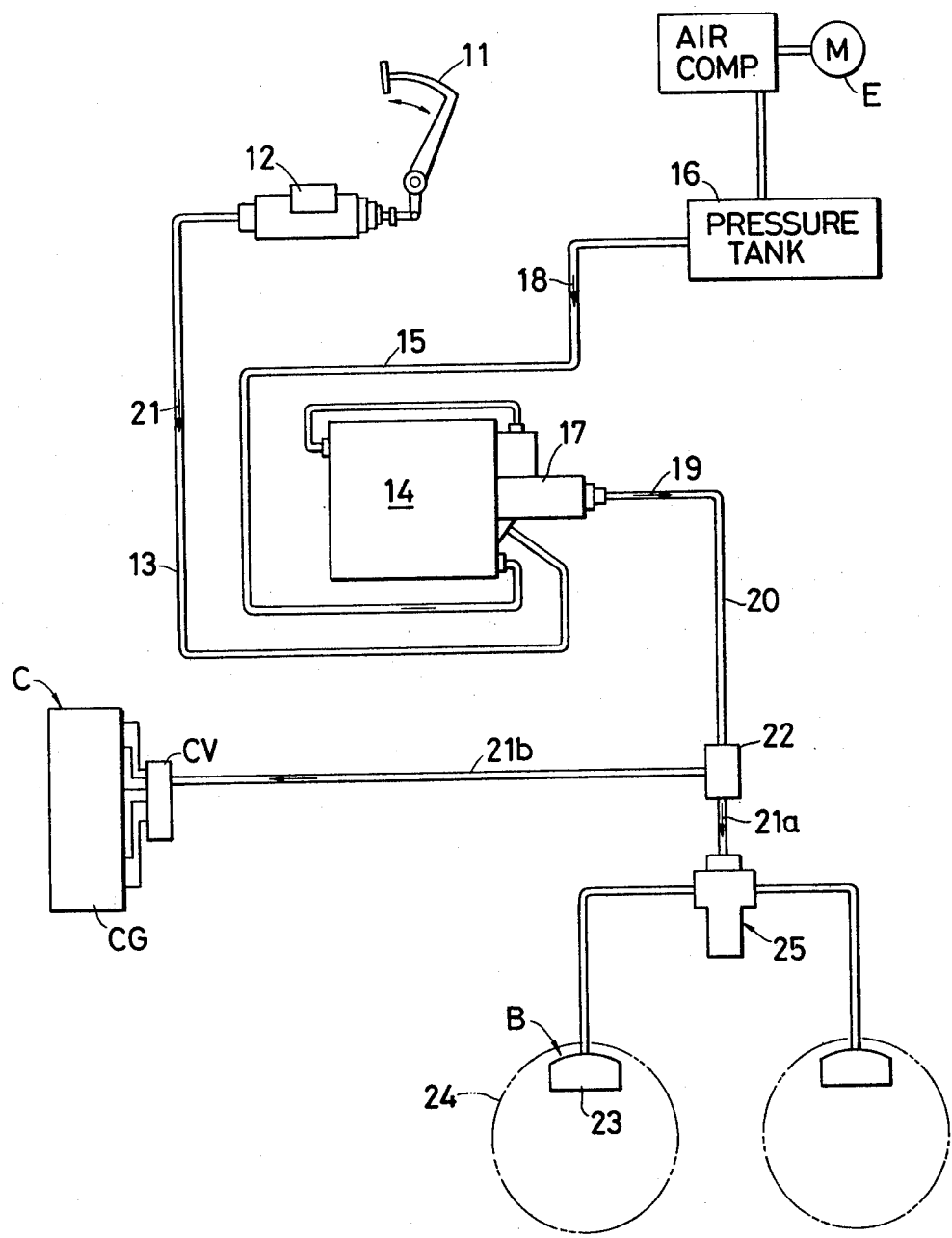
FIG. 1 is a schematic diagram illustrating one embodiment of an inching control system according to the present invention.

Referring to FIG. 1, a vehicle brake pedal 11 is coupled to and controls a master cylinder 12 whose fluid output pressure 21 is communicated to an air booster 14, such as a Hydromaster, over a hydraulic line 13. An air pressure line 15 connects the booster 14 to a pressure tank 16. A master cylinder 17 of the booster is operated by air 18 communicated over line 15 from a pressure tank 16. The line 15 is opened and closed in response to the hydraulic pressure 21 delivered from the master cylinder 12. As may be seen from FIG. 2, the booster 14 serves to boost the hydraulic pressure 19 in its output line 20 in response to the force applied to the brake pedal, which in turn is proportional to the master cylinder output pressure 21. Line 20 branches into lines 21a and 21b through a three-way branch valve 22. Line 21a is connected to a brake system B, while line 21b is connected to a clutch system C. Accordingly, the hydraulic booster pressure from the master cylinder 17 is simultaneously fed to both of the systems B and C.

In the brake system B the brake shoes 23 frictionally engage the brake disks 24 with a force proportional to the hydraulic pressure 19, to thereby implement the braking operation. A limiting valve 25 may also be provided so that when the hydraulic pressure 19 becomes abnormally high, such excess pressure is cut off by the valve 25.

The clutch system C comprises a transmission clutch group CG and a clutch pressure control valve CV, and is so designed that when the hydraulic pressure 19 exceeds a predetermined level higher than the starting or engagement pressure of the brake system B, the clutch is disengaged. The valve CV may be any suitable type of threshold pressure responsive hydraulic control valve, preferably having an adjustable threshold level, well known in the art, such as a double spool valve with adjustable spring biasing. Thus, when the hydraulic pressure 19 is lower than a predetermined high value, the brake system is operated with the clutch still engaged; when the hydraulic pressure 19 exceeds said predetermined value, the brake system is operated with the clutch disengaged. Therefore, just before the brake pedal is fully released to start the vehicle in motion the clutch is automatically engaged, to thereby implement a smooth inching operation.

Figure 3:
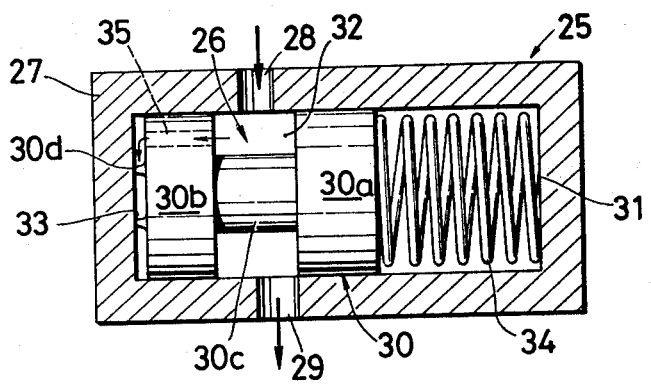
FIG. 3 is a sectional view of the limiting valve shown in FIG. 1.

The limiting valve 25 shown in FIG. 3 comprises a valve body 27, a piston 30, and a spring 34. The valve body 27 has a hydraulic oil inlet port 28 and a hydraulic oil outlet port 29 which communicate with each other through a cylinder chamber 26. The piston 30 consists of large-diameter end portions 30a and 30b joined by a small-diameter central portion 30c. The installed piston divided the cylinder chamber 26 into three chambers 31, 32, and 33. The spring 34 is disposed in the chamber 31, and serves to urge the piston 30 toward the opposite end chamber 33, which communicates with chamber 32 through a small hole 35 in the piston end portion 30b. Stop posts 30d on the end of portion 30b space the latter from the valve body 27 and prevent the chamber 33 from being fully closed.

In operation, hydraulic oil entering through port 28 flows out of the chamber 32 through port 29 when the pressure thereof is below a predetermined level. When the oil pressure exceeds the threshold or limit value, the pressure in chamber 33 overcomes the force of the spring 34 and moves the piston 30 toward the chamber 31, as a result of which the inlet and outlet ports 28, 29 are closed off by the piston end portion 30b.

Figure 4:
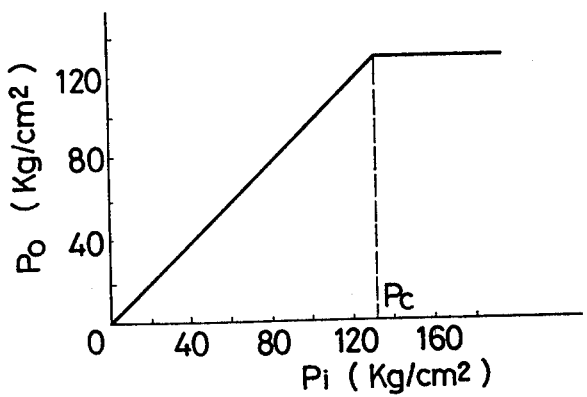
FIG. 4 is a graph showing the relationship between the input and output pressures of the limiting valve.

FIG. 4 shows the relationship between the hydraulic pressure Pi at the inlet port 28 (corresponding to the pressure 19 in line 20) and the pressure Po at the outlet port 29. The value of the cut-off pressure Pc is determined by the strength of the spring 34. The limiting valve 25 merely serves to prevent brake system damage, and is not necessary or essential to the invention. It is disclosed in the interest of completeness because it is incorporated in most industrial vehicle brake systems of this type.

In operation, when the brake pedeal 11 is depressed the master cylinder 12 generates hydraulic pressure 21 in line 13. When this pressure reaches a certain, relatively low level, the air valve (not shown) of the booster 14 is opened, as a result of which the master cylinder 7 of the booster is operated by the air pressure 18 from the tank 16, and the hydraulic pressure 19 in the output line 20 is boosted above the hydraulic pressure 21. The relationship between the depression force of the brake pedal 11 and the hydraulic pressure 19 is shown in FIG. 2.

Figure 2:
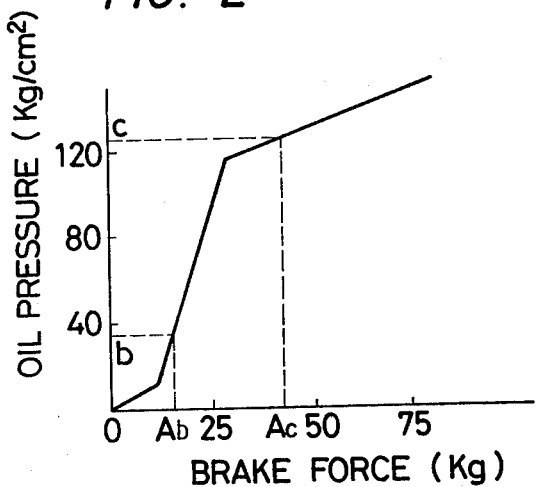
FIG. 2 is a graph showing the relationship between the brake pedal depressing force and the hydraulic fluid output pressure generated by the air booster shown in FIG. 1.

In FIG. 2, b designates the disengagement pressure of the clutch system C, and c designates the cut-off pressure of the limiting valve 25. The corresponding brake pedal depression forces are designated by Ab and Ac, respectively.

In the depression force range from O to Ab the brakes are applied and the speed of the vehicle is reduced with the clutch still engaged. The first knee of the curve, between O and Ab, b, corresponds to the point at which the air valve of the booster 14 is opened. When the brake pedal 11 is depressed past the depression force level Ab, the clutch is disengaged while the brakes continue to be (more strongly) applied, and the vehicle is thus brought to a stop. The hydraulic pressure level designated by b thus corresponds to the threshold or actuation pressure of the clutch system control valve CV. The hydraulic pressure in the brake system does not exceed the value c due to the effect of the limiting valve 25, and accordingly damage to the brake system due to abnormally high pressure is prevented. The second or upper knee of the curve, just below the point Ac, c, corresponds to the point at which the air valve of the booster 14 is closed.

With the vehicle stopped, if the brake pedal 11 is released the clutch is first reengaged (when the hydraulic pressure drops below b), and thereafter the brake system is fully released to enable the starting movement of the vehicle. In a conventional inching control system, on the other hand, there is a time delay between the release of the brakes and the reengagement of the clutch, whereby it is impossible for the vehicle to commence movement immediately upon the release of the brakes. Thus, if the vehicle is on a hill or incline, as is often the case, some degree of dangerous backsliding invariably occurs before forward motion is initiated.

In this invention, however, the vehicle remains stopped during the release of the brake pedal 11 until the clutch becomes engaged. Therefore, if the brake pedal is gradually released the clutch is automatically reengaged before the brakes are fully released, whereby inching is commenced immediately upon the complete release of the brake pedal.

What is claimed is:

1. In an inching control system for an industrial vehicle including a brake pedal, a master cylinder for generating a first hydraulic fluid pressure in proportion to the depression force of the brake pedal, air pressure powered booster means for generating a second hydraulic fluid pressure higher than and in proportional response to the first hydraulic fluid pressure, a vehicle braking system, and a vehicle clutch, the improvement comprising:

(a) a branch valve,
(b) a line coupling the second hydraulic fluid pressure to the input of the branch valve,
(c) a line coupling a first output of the branch valve to the braking system,
(d) a hydraulic threshold pressure responsive control valve for controlling the engagement and disengagement of the clutch, and
(e) a line coupling a second output of the branch valve to the control valve,
(f) the threshold pressure of the control valve being higher than the pressure at which the braking system is actuated to generate a frictional braking force, whereby a limited brake pedal depression force is effective to actuate the braking system while the clutch remains engaged, and an increased brake pedal depression force, sufficient to generate a second hydraulic fluid pressure higher than the threshold pressure, is effective to disengage the clutch while increasing and maintaining the braking force.

* * * * *